United States Patent
Lee et al.

(10) Patent No.: US 7,918,924 B2
(45) Date of Patent: Apr. 5, 2011

(54) 3-DIMENSIONAL AIR BUBBLE TRAPPING APPARATUS AND METHOD THEREOF

(75) Inventors: Hun Joo Lee, Seoul (KR); Soo Suk Lee, Suwon-si (KR); Soo Hyung Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 546 days.

(21) Appl. No.: 12/056,376

(22) Filed: Mar. 27, 2008

(65) Prior Publication Data
US 2009/0064859 A1    Mar. 12, 2009

(30) Foreign Application Priority Data
Sep. 10, 2007    (KR) .................. 10-2007-0091536

(51) Int. Cl.
*B01D 19/00* (2006.01)
(52) U.S. Cl. .............. 95/243; 95/260; 95/261; 96/215; 96/216
(58) Field of Classification Search ............ 95/243, 95/260, 261, 248, 252, 241; 96/215, 216, 96/208, 207, 155
See application file for complete search history.

(56) References Cited

U.S. PATENT DOCUMENTS

| 4,390,351 | A | 6/1983 | Matsui et al. |
| 5,125,541 | A | 6/1992 | Anglehart |
| 6,214,242 | B1* | 4/2001 | Swensen ................. 210/767 |
| 6,475,178 | B1 | 11/2002 | Krajewski et al. |
| 6,981,995 | B2* | 1/2006 | Lombana ................. 55/452 |
| 7,384,451 | B2* | 6/2008 | Shiraishi et al. ............. 95/19 |

* cited by examiner

*Primary Examiner* — Duane Smith
*Assistant Examiner* — Douglas J Theisen
(74) *Attorney, Agent, or Firm* — Cantor Colburn LLP

(57) ABSTRACT

A 3-dimensional air bubble trapping apparatus includes a plurality of chambers, each having an inflow and outflow channel at both ends, and which traps air bubbles in a material introduced through the inflow channel, wherein the chambers are divided into a previous chamber and a next chamber based on a moving direction of the material in the chamber, and wherein the outflow channel of the previous chamber is connected to the inflow channel of the next chamber, and wherein a face perpendicular to an outflow direction of the material in the outflow channel of the previous chamber is not disposed parallel with a face perpendicular to the outflow direction of the material in the outflow channel of the next chamber, whereby air bubbles in the material are trapped without being affected by an angle defined by a gravity direction and vibration of the apparatus.

18 Claims, 7 Drawing Sheets

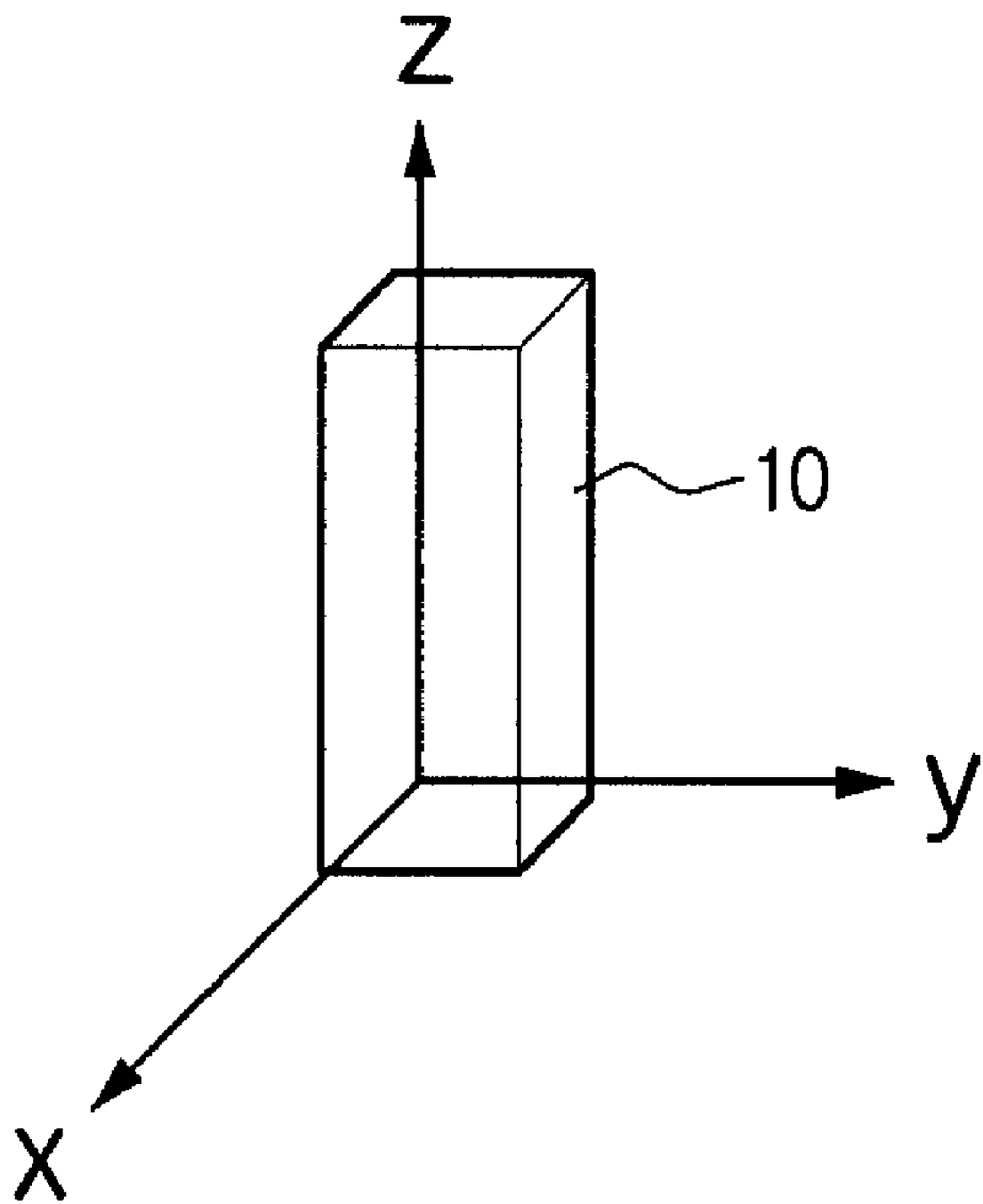

3-DIMENSIONAL AIR BUBBLE TRAPPING APPARATUS AND METHOD THEREOF

This application claims priority to Korean Patent Application No. 10-2007-0091536, filed on Sep. 10, 2007, and all the benefits accruing therefrom under 35 U.S.C. §119, the contents of which in its entirety are herein incorporated by reference.

BACKGROUND OF THE INVENTION

1. Field of the Invention

The present invention relates to a 3-dimensional air bubble trapping apparatus and method thereof, and more particularly to a 3-dimensional air bubble trapping apparatus which can trap air bubbles from a material passing through chambers and a method of trapping air bubbles in a trapping apparatus.

2. Description of the Prior Art

A biosensor using a piezoelectric material measures the amount of a target material using the facts that when the target material is attached to the sensor, the surface weight of the sensor is changed so that the signal of the sensor is thus changed, the target material being composed of bio molecules, including proteins, DNA, virus, bacteria cells, or animal cells or structures, or by-products thereof.

However, such a sensor using the piezoelectric material is also very sensitive to the temperature, the pressure, the viscosity, and the density of the fluid of the target material as well as the weight change of the sensor surface. Particularly, if the target material is a solution, the influence upon the sensor signal becomes dominant by pressure, viscosity, and density relative to the weight change of the sensor surface. Thus, when air bubbles or other disturbances are introduced into the solution, the viscosity and the density of the solution are greatly changed, so that it is impossible for the sensor to normally measure the amount of the target material.

However, in case of the sensor using micro channels and micro chambers, air bubbles are frequently generated upon driving of a micro pump or a micro valve, and the generated air bubbles can be easily moved along the micro channels, so that the sensor signal is easily affected by the air bubbles.

BRIEF SUMMARY OF THE INVENTION

Accordingly, the present invention provides a technology for efficiently removing air bubbles from a target material, such as a fluid, flowing in a sensor. The present invention provides a 3-dimensional air bubble trapping apparatus capable of trapping air bubbles contained in a target material without being affected by an angle defined by the apparatus and a gravity direction even in the case where the apparatus is tilted or vibrated, thereby efficiently removing the air bubbles from the target material and easily applicable to a portable appliance. In other words, the present invention provides an air bubble trapping apparatus which can trap air bubbles from a material passing through chambers without being affected by an angle defined by a gravity direction and the apparatus and vibration of the apparatus by using chambers, which trap the air bubbles in the materials flowing in through inflow channels and discharging the material other than the air bubbles through outflow channels, in such a manner as to be connected with each other such that faces perpendicular to the discharging directions of the respective chambers are not parallel with each other.

In accordance with exemplary embodiments of the present invention, a 3-dimensional air bubble trapping apparatus includes a plurality of chambers, each chamber having an inflow channel and an outflow channel at both ends, and which traps air bubbles in a material introduced through the inflow channel, wherein the chambers are divided into a previous chamber and a next chamber based on a moving direction of the material in the chambers, and wherein the outflow channel of the previous chamber is connected to the inflow channel of the next chamber, and wherein a face perpendicular to an outflow direction of the material in the outflow channel of the previous chamber is not disposed parallel with a face perpendicular to an outflow direction of the material in the outflow channel of the next chamber.

In accordance with other exemplary embodiments of the present invention, an air bubble trapping apparatus includes a first chamber, a first outflow channel extending from an outflow face of the first chamber, a second chamber, an inflow channel connecting the first outflow channel to the second chamber, a second outflow channel extending from an outflow face of the second chamber, a third chamber, an inflow channel connecting the second outflow channel to the third chamber, and a third outflow channel extending from an outflow face of the third chamber, wherein the outflow faces are not parallel to each other and have a larger diameter than the first, second, and third outflow channels.

In accordance with still other exemplary embodiments of the present invention, a method of trapping air bubbles in a trapping apparatus includes arranging a first chamber to receive a material containing air bubbles, the material exiting the first chamber through an outflow face thereof, arranging a second chamber to receive the material from the first chamber, the material exiting the second chamber through an outflow face thereof, and arranging a third chamber to receive the material from the second chamber, the material exiting the third chamber through an outflow face thereof, wherein arranging the first to third chambers includes arranging the outflow faces so as not to be parallel to each other.

According to the 3-dimensional air bubble trapping apparatus of the present invention, air bubbles in the material introduced are trapped without being affected by an angle defined by a gravity direction and the apparatus and vibration of the apparatus by using the plurality of chambers, which trap the air bubbles in the materials, in such a manner as to be connected with each other such that the faces perpendicular to the outflow directions of the respective chambers are not parallel with each other. Further, the apparatus is advantageously applicable to a portable appliance.

BRIEF DESCRIPTION OF THE DRAWINGS

The above and other features and advantages of the present invention will be more apparent from the following detailed description taken in conjunction with the accompanying drawings, in which:

FIG. 3C is a schematic view illustrating still another direction toward which the exemplary first chamber can be arranged;

DETAILED DESCRIPTION OF THE INVENTION

Figure 1:
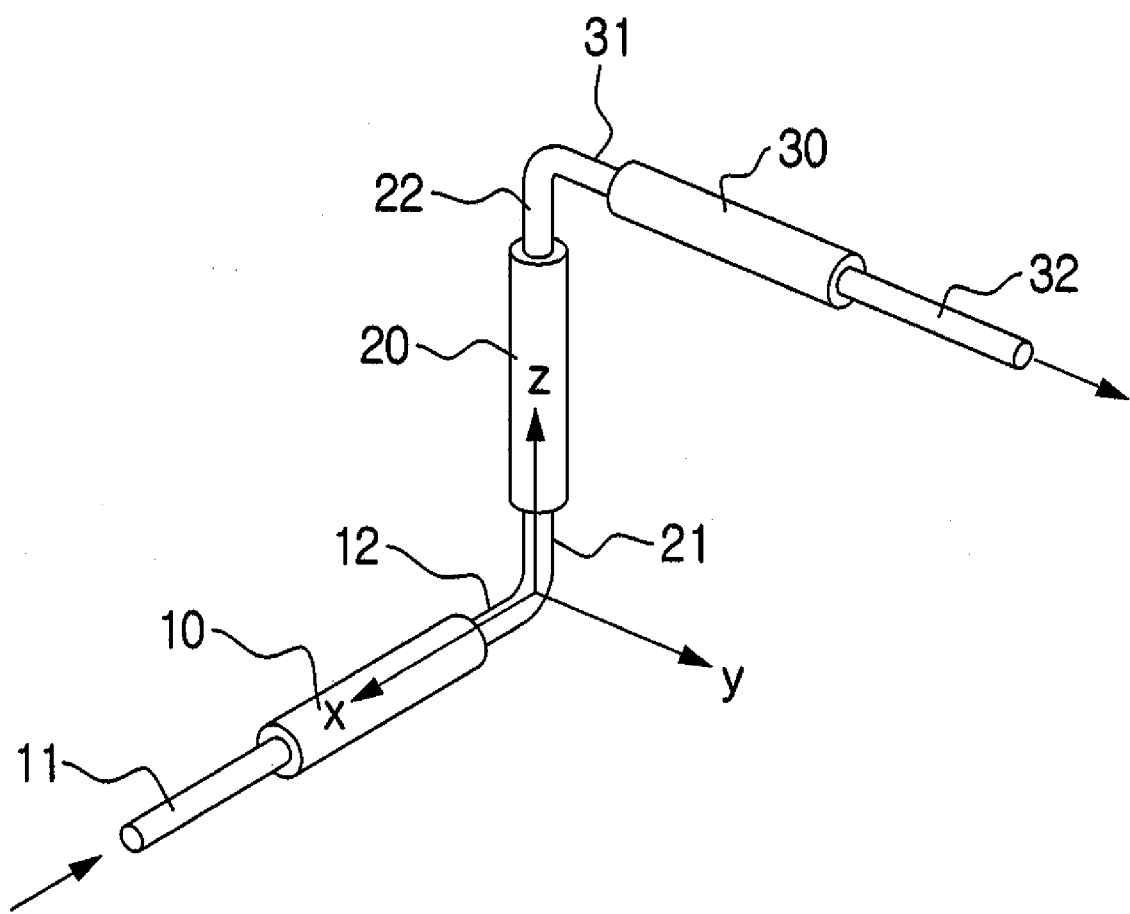
FIG. 1 is a perspective view of an exemplary 3-dimensional air bubble trapping apparatus according to an exemplary embodiment of the present invention.

Hereinafter, exemplary embodiments of the present invention will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

FIG. 1 is a perspective view of an exemplary 3-dimensional air bubble trapping apparatus according to an exemplary embodiment of the present invention, wherein the respective chambers in the apparatus have a linear shape.

Referring to FIG. 1, the 3-dimensional air bubble trapping apparatus includes first to third chambers 10, 20, and 30. A material such as a fluid containing air bubbles passes through the respective chambers 10, 20, 30 and moves toward a direction illustrated by the arrows in FIG. 1. In an exemplary embodiment, the material first moves in an x-direction, then in a z-direction, and then in a y-direction. The chambers 10, 20, or 30 each includes, at both ends, an inflow channel 11, 21, 31 and an outflow channel 12, 22, 32, and are connected in such a manner that an outflow channel of a previous chamber is connected to an inflow channel of a next chamber so as to pass the material therethrough.

For purposes of description, the previous chamber and the next chamber are defined based on the moving direction of the material in the chambers. The previous chamber means a chamber in which a material flows and is discharged through the outflow channel. The next chamber means a chamber of which the inflow channel is connected to the outflow channel of the previous chamber so that the material discharged from the previous chamber flows in the next chamber through the inflow channel of the next chamber.

For example, when the material discharged from the first chamber 10 through the outflow channel 12 is introduced into the inflow channel 21 of the second chamber 20, the first chamber 10 corresponds to the previous chamber, and the second chamber 20 corresponds to the next chamber. Meanwhile, when the material is introduced into the inflow channel 31 of the third chamber 30 through the outflow channel 22 of the second chamber 20 after passing through the second chamber 20, the second chamber 20 corresponds to the previous chamber, and the third chamber 30 corresponds to the next chamber.

The air bubbles included in the material introduced through the respective channels 11, 21, 31 are trapped in the chambers 10, 20, 30 due to a density difference between air and the material while moving in the chambers 10, 20, 30. In an exemplary embodiment, the respective chambers 10, 20, and 30 have diameters larger than the diameters of the outflow channels 12, 22, and 32, and the air bubbles are trapped in the space defined within the chambers 10, 20, 30 due to the difference of the diameters. Also in an exemplary embodiment, the outflow channels 12, 22, and 32 are substantially centrally disposed with respect to the outflow faces of the respective chambers 10, 20, and 30. The material discharged into the outflow channel of the previous chamber is introduced into the inflow channel of the next chamber, and the air bubbles or any remaining air bubbles are then trapped in the next chamber.

In order to efficiently trap the air bubbles, the respective chambers 10, 20, and 30 are arranged such that a face perpendicular to an outflow direction of the material in the outflow channel of the previous chamber is not parallel with a face perpendicular to an outflow direction of the material in the outflow channel of the next chamber. In this case, the outflow directions of the previous chamber and the next chamber are not identical to each other so that the air bubbles which were not trapped in the previous chamber can be trapped in the next chamber. In an exemplary embodiment, it may be configured such that the outflow directions of the previous chamber and the next chamber are perpendicular, or substantially perpendicular, to each other. Also in an exemplary embodiment, a face of a previous chamber adjacent its outflow channel may be arranged to be perpendicular, or substantially perpendicular, to a face of a next chamber adjacent its outflow channel. The faces of the previous chamber and the next chamber that are adjacent their respective outflow channels may be termed outflow faces, for convenience of description, and the outflow faces of the previous chamber and the next chamber are not parallel to each other.

Figure 2A:
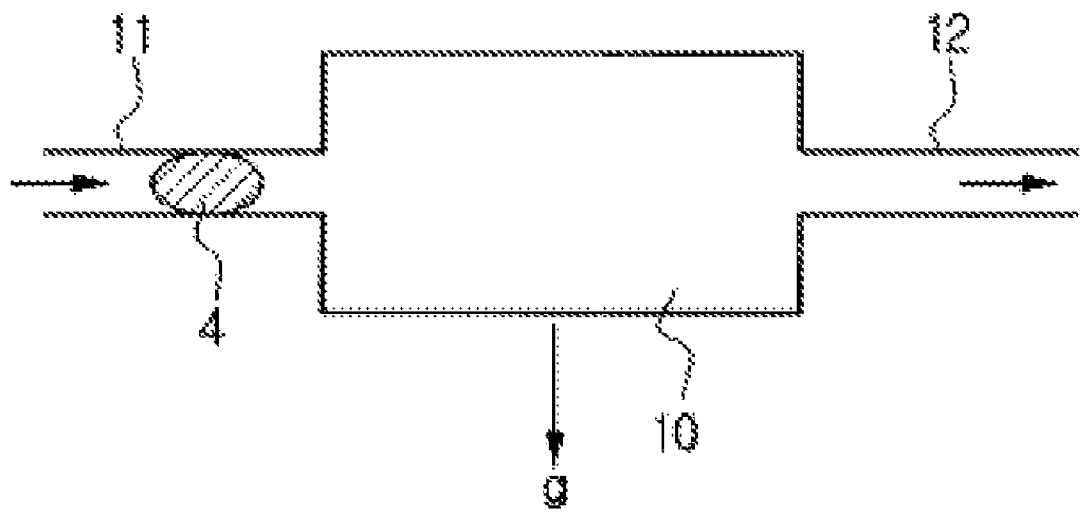
FIG. 2A is a sectional view of an exemplary first chamber of the exemplary apparatus illustrated in FIG. 1.
Figure 2B:
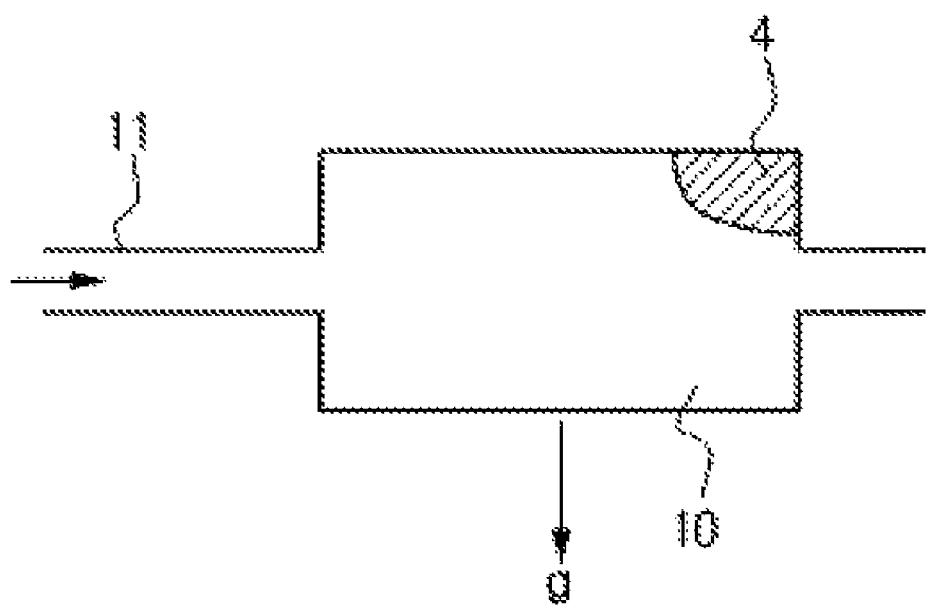
FIG. 2B is another sectional view of an exemplary first chamber of the exemplary apparatus illustrated in FIG. 1.

FIGS. 2A through 2D are sectional views of an exemplary first chamber of the exemplary apparatus illustrated in FIG. 1. In FIGS. 2A through 2D, the arrows inside the chamber 10 and its inflow and outflow channels 11, 12 denote the moving direction of the material, and the arrow outside the chamber 10 denotes a gravity direction g. As illustrated in the drawings, the operation is illustrated in a case where the gravity direction g is directed downward in the drawings. In FIG. 2A, the material, such as a fluid, containing an air bubble 4 is introduced into the first chamber 10 through the inflow channel 11. In FIG. 2B, the fluid passes through the first chamber 10 while moving in an arrow direction, and the air bubble 4 contained in the fluid moves upward, i.e., toward anti-gravity direction, a direction opposite the gravity direction g, due to a density difference from the fluid.

Figure 2C:
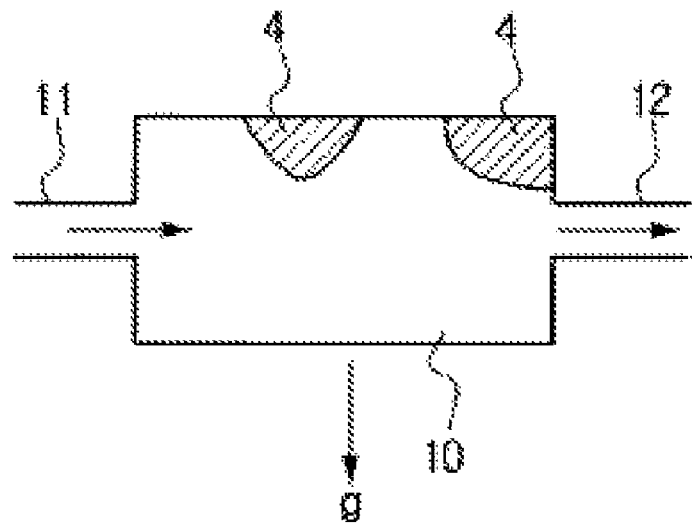
FIG. 2C is still another sectional view of an exemplary first chamber of the exemplary apparatus illustrated in FIG. 1.

Referring to FIG. 2C, the fluid is discharged from the first chamber 10 through the outflow channel 12. The first chamber 10 has a diameter larger than the diameter of the outflow channel 12, so that the air bubble 4 positioned upward the first chamber 10 cannot be discharged through the outflow channel 12, but is trapped in the first chamber 10. While FIGS. 2A through 2D have illustrated a section of the first chamber 10, the sections of the second and third chambers 20 and 30 may also be identical or substantially identical to the first chamber 10, and the air bubble 4 can be trapped by the same operating principle within the second and third chambers 20 and 30.

Figure 2D:
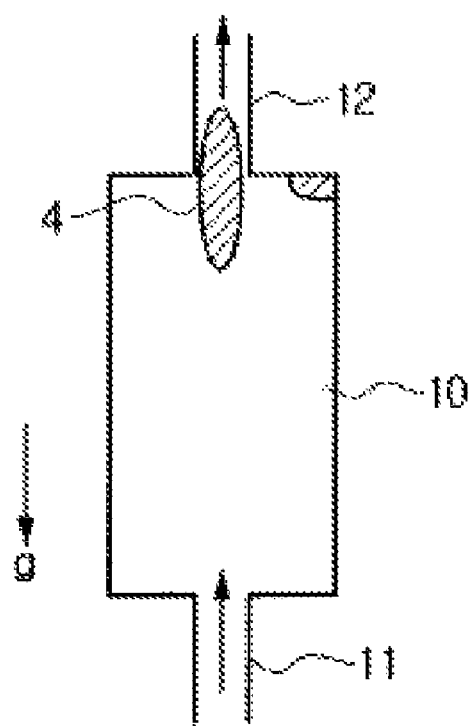
FIG. 2D is still another sectional view of an exemplary first chamber of the exemplary apparatus illustrated in FIG. 1.

Meanwhile, FIG. 2D illustrates the case where the bubble trapping apparatus is tilted so that the first chamber 10 is arranged in the lengthwise direction relative to the gravity direction g. The air bubble 4 moves in the anti-gravity direction, i.e., upward in the first chamber 10 and in a direction opposite the gravity direction g, and in this case, the moving direction of the air bubble 4 is identical or at least substantially identical to that of the fluid in the first chamber 10. Therefore, the air bubble 4 cannot be trapped in the first chamber 10, and the material introduced into the first chamber 10 is wholly discharged through the outflow channel 12, including the air bubble 4.

Figure 3A:
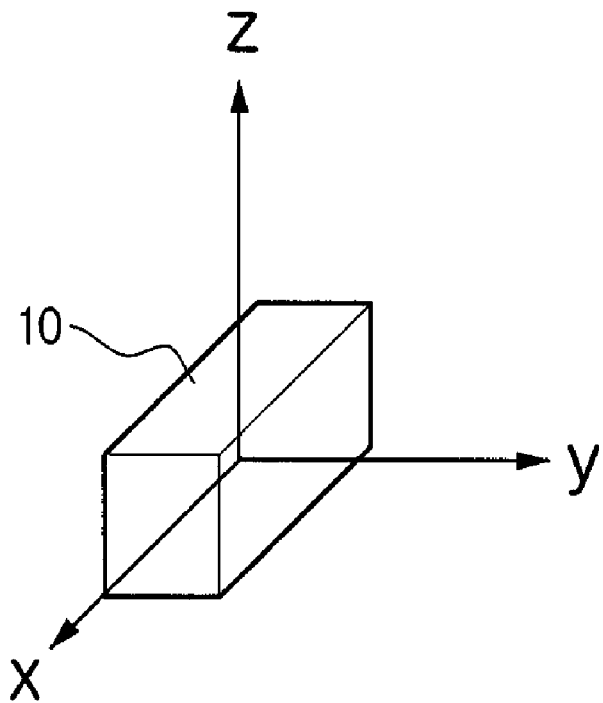
FIG. 3A is a schematic view illustrating a direction toward which the exemplary first chamber can be arranged.
Figure 3B:
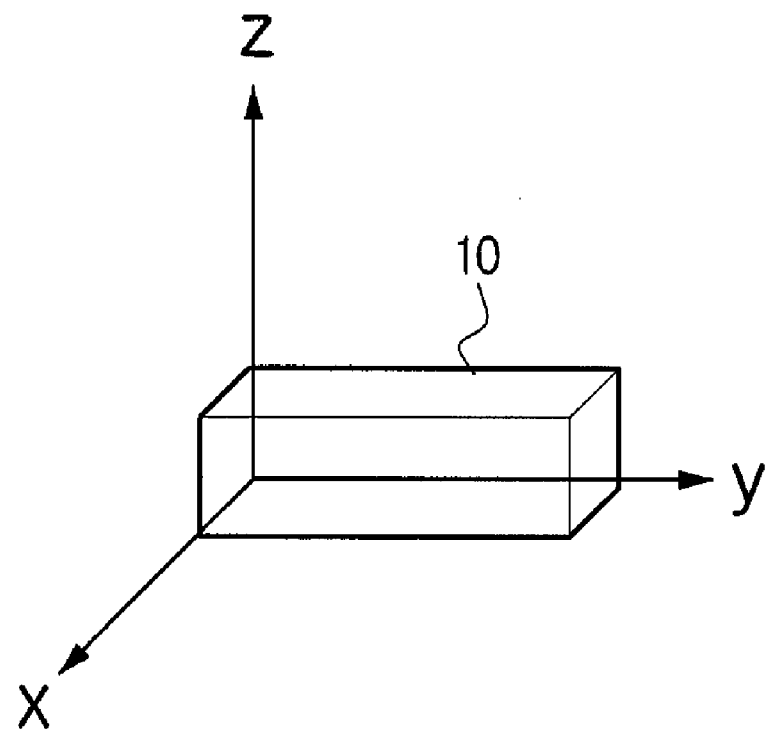
FIG. 3B is a schematic view illustrating another direction toward which the exemplary first chamber can be arranged.

FIGS. 3A through 3C are schematic views illustrating the respective directions toward which the exemplary first chamber can be arranged. Assuming that the gravity direction is downward in the drawing, i.e., a negative direction of z-axis, like in FIGS. 2A through 2D, the operation of the first chamber 10 will now be explained with reference to FIGS. 2A through 2D and 3A through 3C. When the first chamber 10 is arranged along an x-axis or a y-axis as illustrated in FIGS. 3A and 3B, the gravity direction and the moving direction of the fluid are perpendicular to each other, so that the first chamber 10 can trap the air bubble 4 as illustrated in FIGS. 2A through 2C. On the contrary, when the first chamber 10 is arranged along a z-axis as illustrated in FIG. 3C, the gravity direction and the moving direction of the fluid are aligned to each other, so that it is impossible for the first chamber 10 to trap the air bubble 4 as illustrated in FIG. 2D.

The air bubble 4 discharged through the outflow channel 12 of the first chamber 10 is introduced into the second chamber 20 through the inflow channel 21 of the second chamber 20. The second chamber 20 has the same structure as the first chamber 10, and the first and second chambers 20, 30 are connected to each other such that the inflow channel 21 of the second chamber 20 is perpendicular to the outflow channel 12 of the first chamber 10. In a case where the first chamber 10 as the previous chamber cannot trap the air bubble 4 in the fluid because the moving direction of the fluid is aligned with the gravity direction g, such as in FIG. 2D, then the second chamber 20 as the next chamber can trap the air bubble 4 because the gravity direction g and the moving direction of the fluid are perpendicular to each other.

Similarly, the material passing through the second chamber 20 is introduced into the inflow channel 31 of the third chamber 30 through the outflow channel 22 of the second chamber 20. In the embodiment illustrated in FIG. 1, the third chamber 30 is disposed perpendicular to the first chamber 10 and to the second chamber 20, so that similarly as set forth before in connection with the second chamber 20, the third chamber 30 can trap the air bubble 4 that is not trapped in the first chamber 10 and the second chamber 20. Since the respective chambers 10, 20, and 30 all are aligned in a different direction from each other, even when the gravity is applied toward any direction, such as by a tilting of the apparatus, at least one of the respective chambers 10, 20, 30 can essentially trap the air bubble 4.

Figure 4:
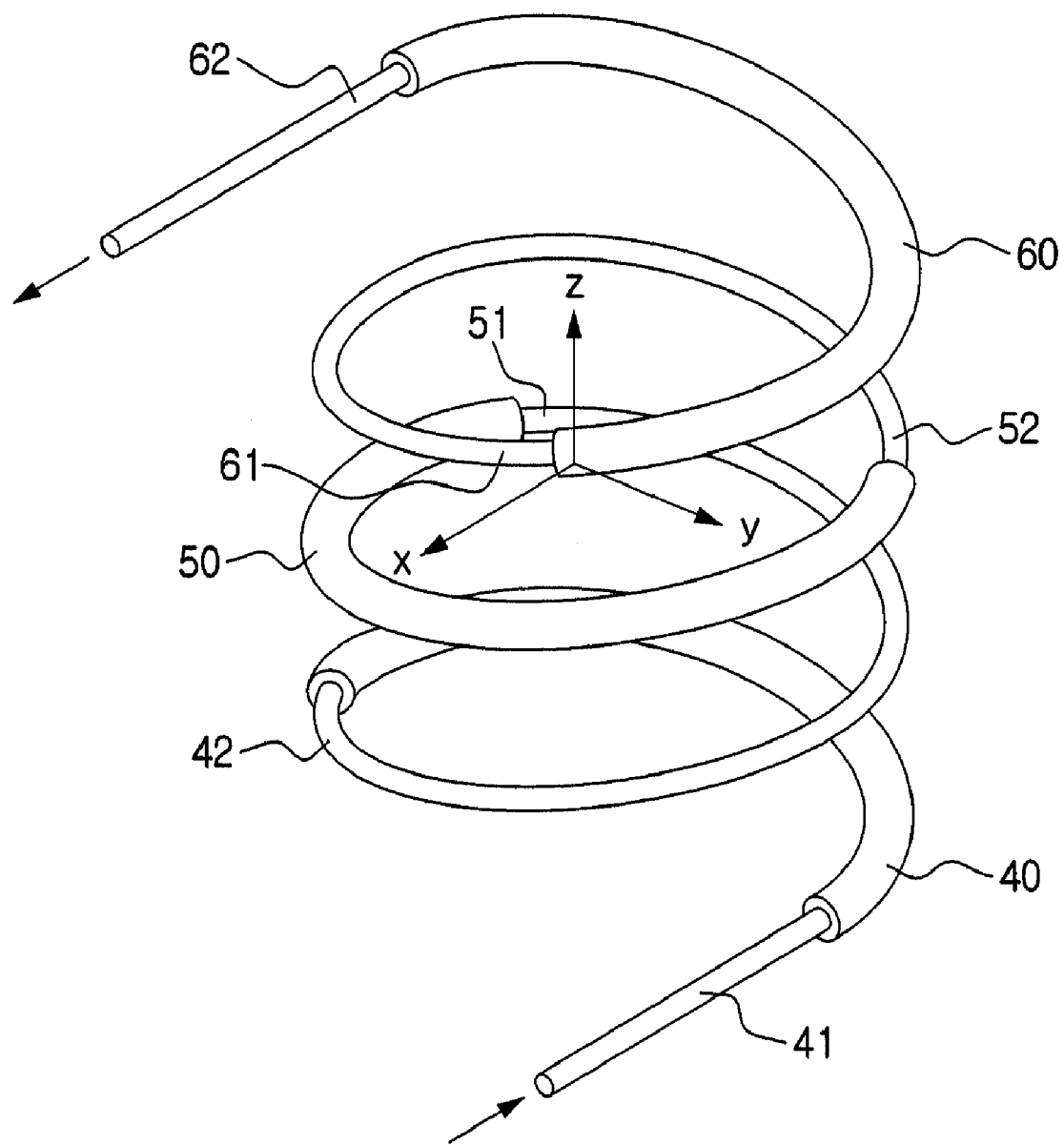
FIG. 4 is a perspective view of an exemplary 3-dimensional air bubble trapping apparatus according to another exemplary embodiment of the present invention.

FIG. 4 is a perspective view of an exemplary 3-dimensional air bubble trapping apparatus according to another exemplary embodiment of the present invention, wherein the exemplary respective chambers have a spiral shape.

Referring to FIG. 4, the air bubble trapping apparatus includes fourth to sixth chambers 40, 50, 60 connected to each other. The chambers 40, 50, 60 may be tubular shaped and curved to connect to each other in a spiral. The chambers 40, 50, or 60 each include, at both ends, an inflow channel 41, 51, 61 and an outflow channel 42, 52, 62, respectively, and are connected in such a manner that an outflow channel of a previous chamber is connected to an inflow channel of a next chamber. The inflow channel 41, 51, or 61 is a passage through which the material, which may contain the air bubble, is introduced into the respective chambers 40, 50, 60, and the outflow channel 42, 52, or 62 is a passage through which the material of which the air bubble is removed while passing through the respective chambers 40, 50, 60 is discharged.

The air bubbles included in the material introduced through the respective inflow channels 41, 51, 61 are trapped in the chambers 40, 50, 60 due to a density difference between air and the material while moving in the chambers 40, 50, 60. In an exemplary embodiment, the diameters of the respective chambers 40, 50, and 60 are larger than the diameters of the outflow channels 42, 52, and 62, and the air bubbles are trapped in the space defined due to the difference of the diameters.

In the respective chambers 40, 50, 60, the material discharged through the outflow channel of the previous chamber is introduced into the inflow channel of the next chamber, and the air bubbles that are not trapped in the previous chamber are then trapped in the next chamber. In order to efficiently trap the air bubbles, a face perpendicular to an outflow direction of the material in the outflow channel of the previous chamber is not parallel with a face perpendicular to an outflow direction of the material in the outflow channel of the next chamber. That is, the face of the previous chamber adjacent its outflow channel may not be parallel to the face of the next chamber adjacent its outflow channel. The faces of the previous chamber and the next chamber that are adjacent their respective outflow channels may be termed outflow faces, for convenience of description. In this case, the outflow directions of the previous chamber and the next chamber are not identical to each other so that the air bubbles not trapped in the previous chamber can be trapped in the next chamber.

In the embodiment illustrated in FIG. 4, the respective chambers 40, 50, 60 are shaped together like a spiral, and the moving direction of the fluid passing through the chambers 40, 50, 60 are varied circularly. Since the moving direction of the fluid is varied along the spiral chambers 40, 50, 60, the air bubble in the fluid is moved toward a wall face in the chambers 40, 50, 60 regardless of what the gravity direction is. The material passed through the chambers 40, 50, 60 is discharged through the outflow channels 42, 52, 62, and the air bubble in the chambers 40, 50, 60 cannot be discharged due to a diameter difference between the chambers 40, 50, 60 and the outflow channels 42, 52, 62, but is trapped in the chambers 40, 50, 60.

In the embodiment illustrated in FIG. 4, since the respective chambers 40, 50, 60 have a cylinder shape or tubular shape, they can trap the air bubble positioned at whole angles (360°). Even when the respective chambers 40, 50, 60, however, have an interior angle smaller than 360°, they extend spirally and are varied in angle of chamber, so that they can trap the air bubble in a whole angle range. For the purposes of description, the interior angle means an angle that the largest diameter area in the section of the chamber defines.

Figure 5:
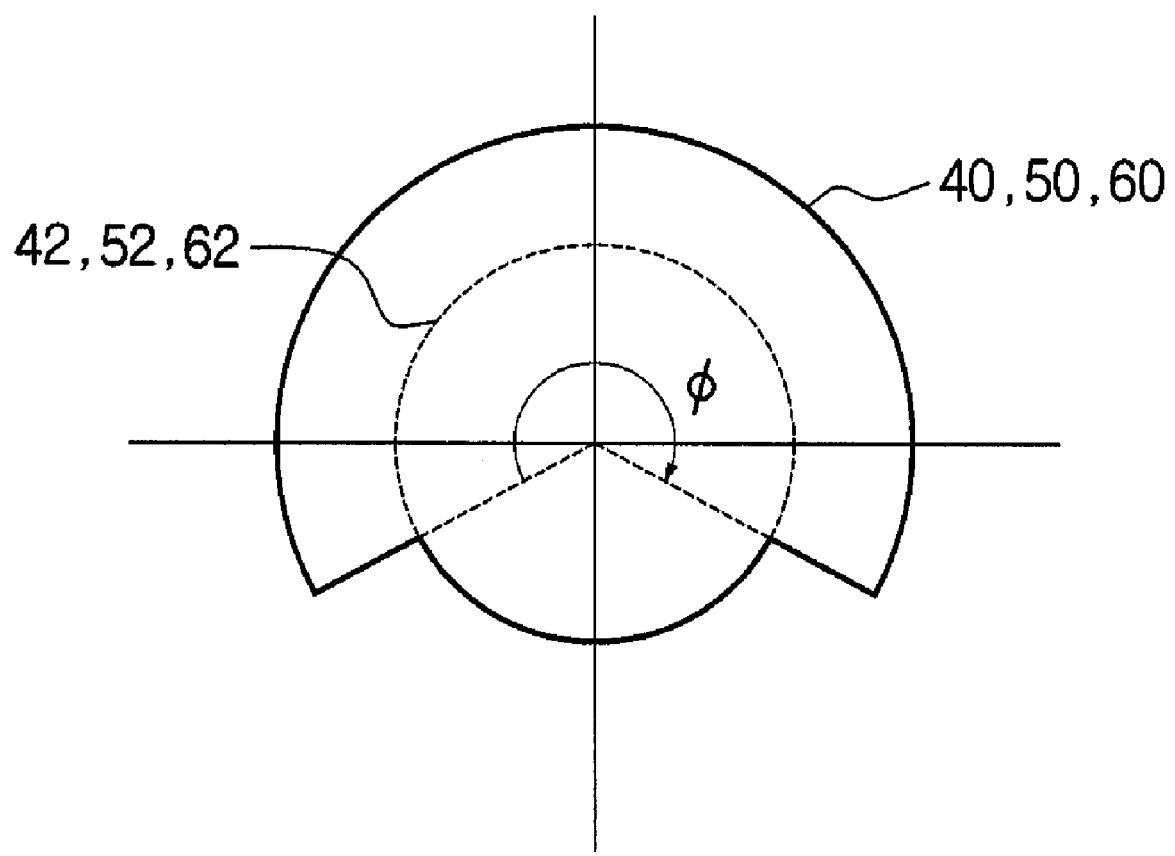
FIG. 5 is a sectional view illustrating a section of an exemplary chamber having an interior angle below 360 degrees according to an exemplary embodiment of the present invention.

FIG. 5 is a sectional view illustrating a section of an exemplary chamber having an interior angle less than 360° according to an exemplary embodiment of the present invention. It can be seen that the interior angle Φ of the chamber area having a diameter larger than the diameter of the outflow channels 42, 52, 62 in the respective chambers 40, 50, 60 is within 360°. In this case, in order to trap the air bubble within the whole angle range while extending spirally, the interior angle Φ of the respective chambers 40, 50, 60 is preferably at least 180° or more.

Table 1 below shows a result of air bubble trapping using the exemplary 3-dimensional air bubble trapping apparatus according to an exemplary embodiment of the present invention.

TABLE 1

| Direction of Apparatus | Number of Inflow Air Bubbles | Number of Outflow Air Bubbles |
|---|---|---|
| x-axis | 10 | 0 |
| y-axis | 10 | 0 |
| z-axis | 10 | 0 |

In Table 1, the direction of the exemplary apparatus is aligned along any one of x-, y-, and z-axes as illustrated in FIGS. 3A through 3C. As shown in Table 1, it can be understood that whatever direction the apparatus is aligned, the air bubble introduced into the apparatus cannot be discharged, but is trapped in the apparatus.

As set forth above, according to the 3-dimensional air bubble trapping apparatus of the present invention, air bubbles in the material introduced into the apparatus are trapped without being affected by an angle defined by a gravity direction and the apparatus and vibration of the apparatus by using the plurality of chambers, which trap the air bubbles in the materials, in such a manner as to be connected with each other such that the faces perpendicular to the outflow directions of the respective chambers are not parallel with each other. Further, the apparatus is advantageously applicable to a portable device.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A 3-dimensional air bubble trapping apparatus comprising a plurality of chambers, each chamber having an inflow channel and an outflow channel at both ends, and which traps air bubbles in a material introduced through the inflow channel of each chamber, wherein the chambers are divided into a previous chamber and a next chamber based on a moving direction of the material in the chamber, and wherein the outflow channel of the previous chamber is connected to the inflow channel of the next chamber, and wherein a face perpendicular to an outflow direction of the material in the outflow channel of the previous chamber is not disposed parallel with a face perpendicular to an outflow direction of the material in the outflow channel of the next chamber.

2. The 3-dimensional air bubble trapping apparatus according to claim 1, wherein each of the chambers has a linear shape.

3. The 3-dimensional air bubble trapping apparatus according to claim 2, wherein the previous chamber and the next chamber are connected to each other such that the outflow direction of the previous chamber is perpendicular to the outflow direction of the next chamber.

4. The 3-dimensional air bubble trapping apparatus according to claim 1, wherein the chambers have a spiral shape.

5. The 3-dimensional air bubble trapping apparatus according to claim 4, wherein any one of the previous chamber and the next chamber has an interior angle of about 180° or more.

6. The 3-dimensional air bubble trapping apparatus according to claim 1, wherein any one of the previous chamber and the next chamber has a diameter larger than a diameter of the outflow channel of a corresponding chamber.

7. An air bubble trapping apparatus comprising:
a first chamber;
a first outflow channel extending from an outflow face of the first chamber;
a second chamber;
an inflow channel connecting the first outflow channel to the second chamber;
a second outflow channel extending from an outflow face of the second chamber;
a third chamber;
an inflow channel connecting the second outflow channel to the third chamber; and
a third outflow channel extending from an outflow face of the third chamber;
wherein the outflow faces are not parallel to each other and have a larger diameter than the first, second, and third outflow channels.

8. The air bubble trapping apparatus according to claim 7, wherein the first chamber extends in a longitudinal direction substantially perpendicular to a longitudinal direction of the second chamber, and the third chamber extends in a longitudinal direction substantially perpendicular to the longitudinal direction of the second chamber and substantially perpendicular to the longitudinal direction of the first chamber.

9. The air bubble trapping apparatus according to claim 7, wherein the outflow faces of the first, second, and third chambers are substantially perpendicular to each other.

10. The air bubble trapping apparatus according to claim 7, wherein the first outflow channel extends substantially perpendicular to the inflow channel connected to the second chamber, the second outflow channel extends substantially perpendicular to the inflow channel connected to the third chamber, and the inflow channel connected to the third chamber extends substantially perpendicular to the first outflow channel.

11. The air bubble trapping apparatus according to claim 7, wherein the first, second, and third outflow channels are substantially centrally disposed with respect to the outflow faces of the first, second, and third chambers, respectively.

12. The air bubble trapping apparatus according to claim 7, wherein the first chamber, the first outflow channel, the inflow channel connected to the second chamber, the second chamber, the second outflow channel, the inflow channel connected to the third chamber, the third chamber, and the third outflow channel are sequentially arranged in a spiral shape.

13. The air bubble trapping apparatus according to claim 7, wherein, depending on a direction of gravity, air bubbles within a material introduced into the first chamber are trapped by one of the first, second, or third chamber.

14. A method of trapping air bubbles in a trapping apparatus, the method comprising:
arranging a first chamber to receive a material containing air bubbles, the material exiting the first chamber through an outflow face thereof;
arranging a second chamber to receive the material from the first chamber, the material exiting the second chamber through an outflow face thereof; and
arranging a third chamber to receive the material from the second chamber, the material exiting the third chamber through an outflow face thereof;
wherein arranging the first to third chambers includes arranging the outflow faces so as not to be parallel to each other.

15. The method according to claim 14, further comprising arranging a first inflow channel to introduce the material into the first chamber, a first outflow channel to receive the material from the first chamber, a second inflow channel to receive the material from the first outflow channel, a second outflow channel to receive the material from the second chamber, a third inflow channel to receive the material from the second outflow channel, and a third outflow channel to receive the material from the third chamber.

16. The method according to claim 15, wherein the outflow faces of the first to third chambers have a greater diameter than a diameter of the first to third outflow channels.

17. The method according to claim 14, wherein the first to third chambers each extend substantially linearly, and arranging the first to third chambers includes arranging the second chamber substantially perpendicular to the first chamber, the third chamber substantially perpendicular to the second chamber, and the third chamber substantially perpendicular to the first chamber.

18. The method according to claim 14, wherein the first to third chambers each include a curved shape, and arranging the first to third chambers includes arranging the first, second, and third chambers sequentially in a spiral pattern.

* * * * *